Jan. 11, 1955 A. W. GAUBATZ 2,699,040
DETACHABLE COMBUSTION CHAMBER FOR GAS TURBINES
Filed May 23, 1950 3 Sheets-Sheet 1
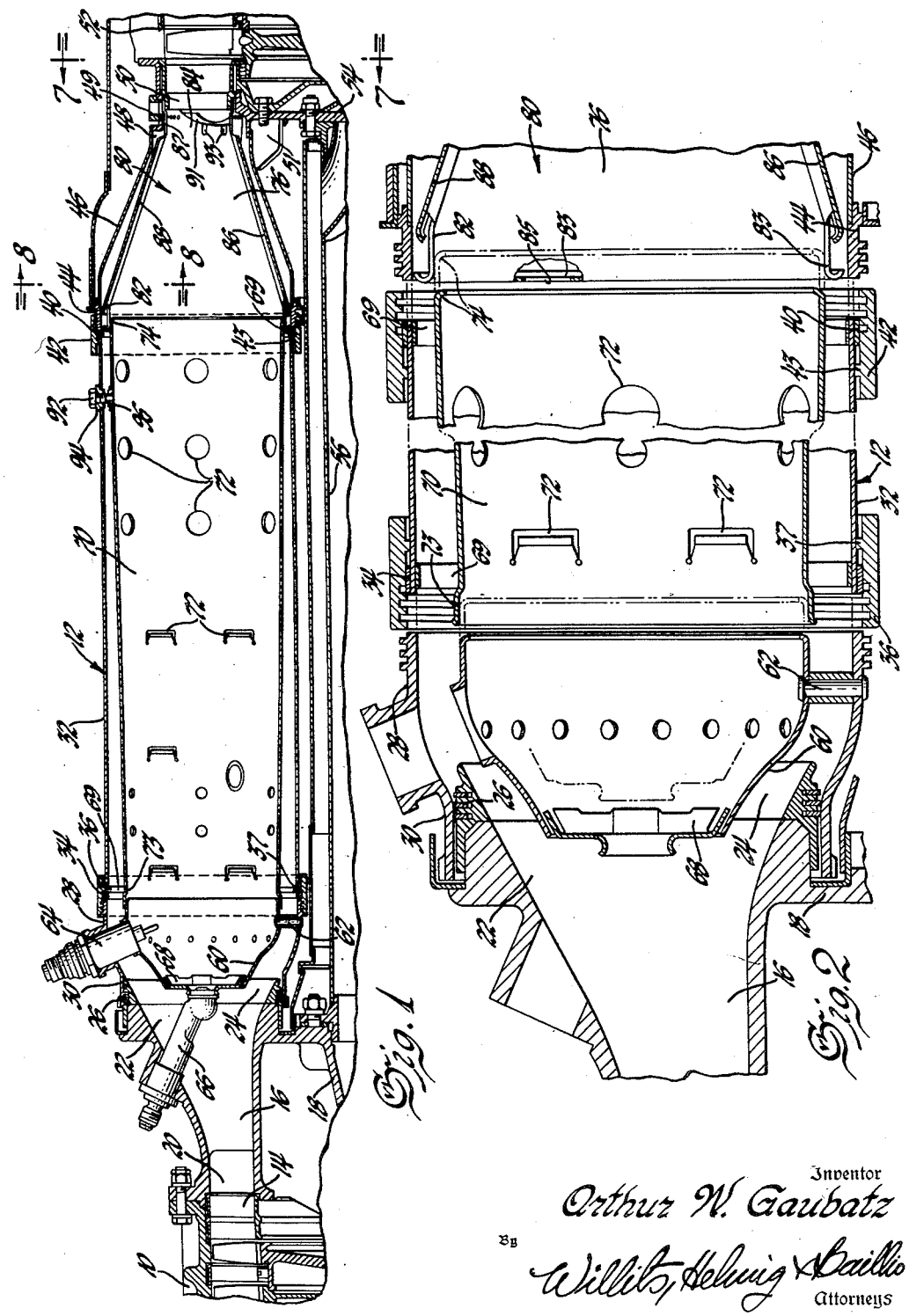
Inventor
Arthur W. Gaubatz
By
Willits, Helwig & Baillio
Attorneys

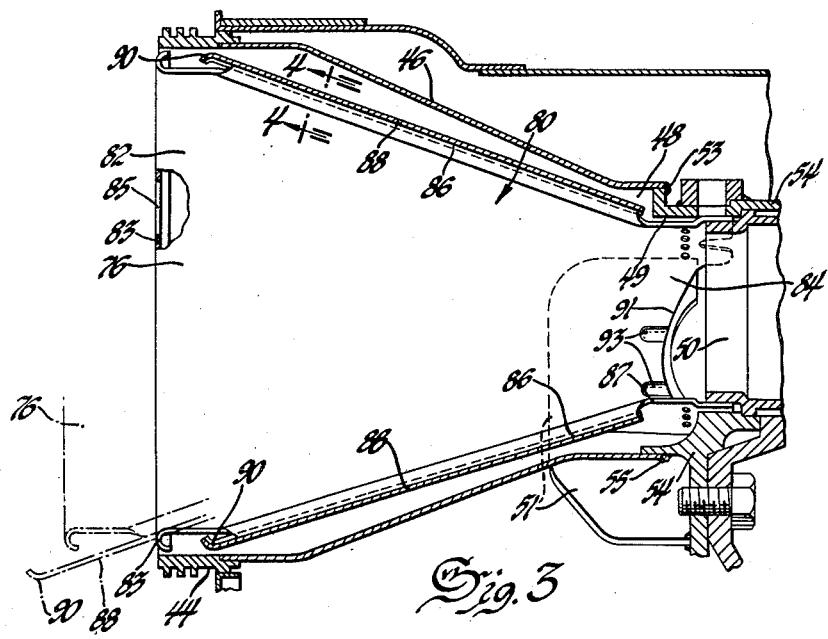
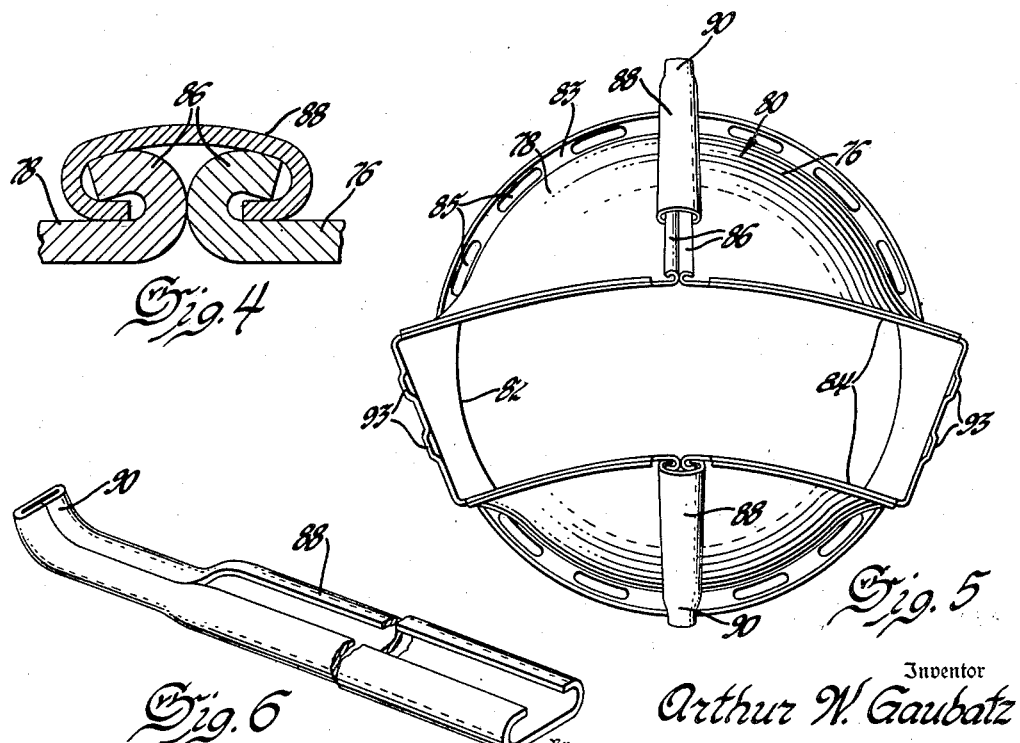

Jan. 11, 1955     A. W. GAUBATZ     2,699,040
DETACHABLE COMBUSTION CHAMBER FOR GAS TURBINES
Filed May 23, 1950     3 Sheets-Sheet 3

Inventor
Arthur W. Gaubatz
By Willits, Helwig & Baillio
Attorneys

United States Patent Office 2,699,040
Patented Jan. 11, 1955

2,699,040

DETACHABLE COMBUSTION CHAMBER FOR GAS TURBINES

Arthur W. Gaubatz, Indianapolis, Ind., assignor to General Motors Corporation, Detroit, Mich., a corporation of Delaware Application May 23, 1950, Serial No. 163,588

14 Claims. (Cl. 60—39.65)

This invention relates to combustion engines, and more particularly to a combustion chamber or burner structure for a gas turbine engine.

Gas turbine engines use a plurality of burners arranged in an annular group between the compressor and turbine. These burners, where the fuel is burned, operate at extremely high temperatures which reduces the life of the parts to a relatively short period. Special materials and alloys for withstanding the heat are used whenever feasible, but even then it frequently becomes necessary to replace parts which have been deteriorated by the heat beyond further utility.

Each of the burners is a complete combustion chamber. The air enters from the compressor and is mixed with the fuel as it enters the liner where the fuel burns. Air also passes between the liner and the burner shell to cool the burner and to supply additional air at later stages of combustion. The burner shell and liner are arranged for rapid removal and replacement of the parts with particular emphasis on the liner parts. The burner shell is made in three parts. A forward part is slidably mounted on the compressor housing and a rear part is secured to the turbine. A central cylindrical part has threaded collars at each end to secure it to the forward part and to the rear part on the turbine housing. A forward portion of the liner is secured within the forward portion of the shell and is slidable therewith. The liner has a central cylindrical portion substantially coextensive with the central part of the shell and fitting around the forward liner portion. A two-part rear portion of the liner is mounted in the rear shell part. The rear end of the central liner portion fits into the circular front end of the rear portion of the liner which has an outlet of annular sector shape connected to the turbine inlet. The shell is unclamped and the forward part of the shell and liner moved forward to disengage the central parts of the shell and liner to remove them. The two-part rear liner section is then separated and removed. The replacement parts can then be inserted in the same manner and clamped in position.

The primary object of this invention is to provide an improved burner construction wherein the liner in which the combustion takes place is positioned within a shell which may be simply and rapidly installed and removed.

Another object of the invention is to provide an improved liner construction for a combustion chamber, consisting of a telescopically mounted cylinder section which is released by the axial movement of one of the supporting portions so that it can be rapidly removed and replaced when it is burned out.

Another object of this invention is to provide an improved burner construction having a liner spaced from the burner shell and formed in two pairs of telescopic sections, one of which is secured together and slidably mounted on a supporting frame so that the burner may be disassembled and cooling air can pass between the liner and shell.

These and other objects of the invention are more fully explained in the following specification and drawings.

In the drawings:

Figure 1 is a vertical longitudinal sectional view taken through the burner.

Figure 2 is an enlarged partial section showing the elements of the burner in position for disassembly.

Figure 3 is an enlarged sectional view showing the rear portion of the burner.

Figure 4 is an enlarged sectional view taken on the line 4—4 of Figure 3 in the direction of the arrows.

Figure 5 is an enlarged end view of the rear portion of the burner lining showing one of the fasteners partially removed.

Figure 6 is a partial perspective view of the fastening device.

Figure 7:
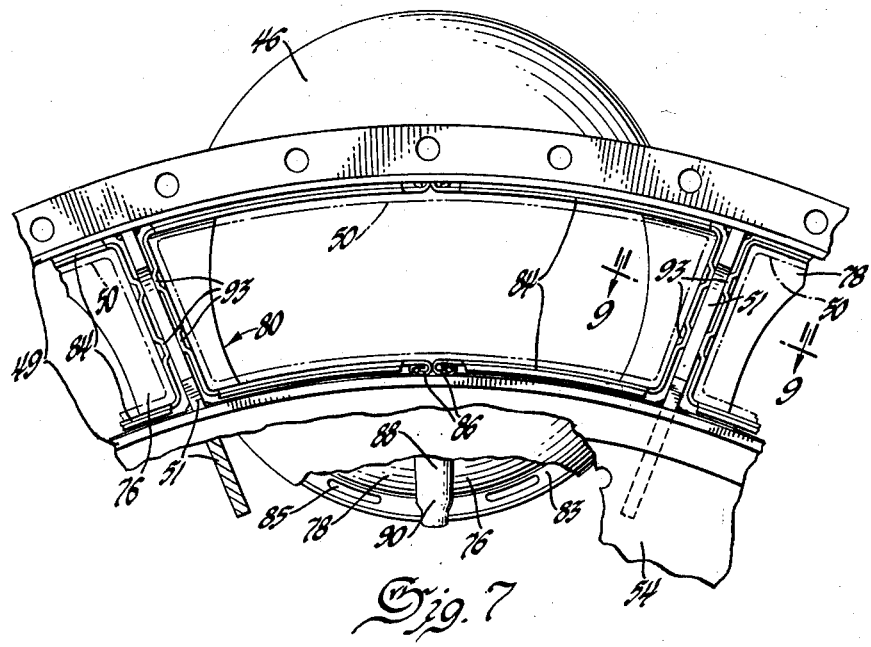
Figure 7 is an enlarged partial section on the line 7—7 of Figure 1 with parts broken away to show details.

Referring more specifically to Figure 1, which shows one burner unit and the adjacent portions of the compressor and turbine of a compressor turbine propeller power plant, it is pointed out that this burner is one of a number arranged in an annular group about the main shaft of the power plant. The location of adjacent burner portions of the annular group is best shown in Figure 7. The axial compressor 10 is mounted forward of the burner 12 and has an annular outlet passage 14. A passage 16 formed as an integral portion of the power plant housing 18 has an annular opening 20 connected to the compressor outlet 14 and a number of circular outlets 22 providing connections to the burners 12.

Figure 8:
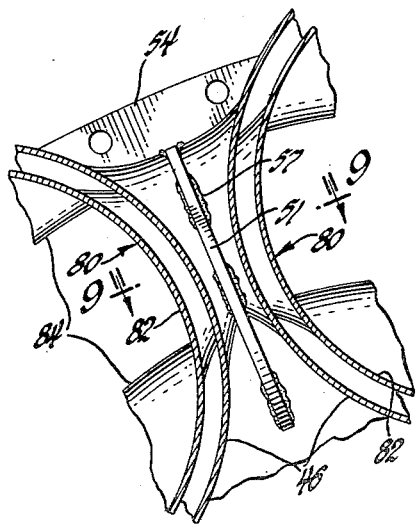
Figure 8 is an enlarged partial section on line 8—8 of Figure 1.
Figure 9:
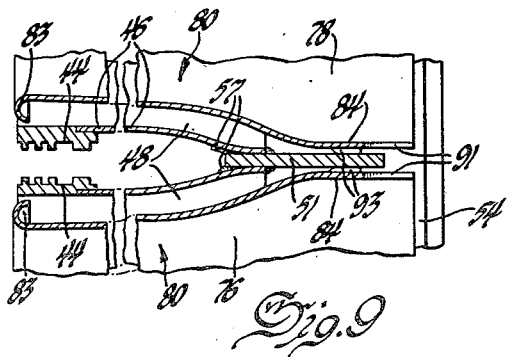
Figure 9 is a partial section on the lines 9—9 of Figures 7 and 8.

At the outlet end 22 of passage 16 a bushing member 24 having an exterior cylindrical surface with sealing rings 26 is secured to the member 16. The forward part 28 of the burner shell has a forward cylindrical portion 30 slidably mounted on the cylindrical portion of the bushing 24 and sealed thereto by the rings 26. The central part of the burner shell 32 has a generally cylindrical shape and a cylindrical flange or abutment 34 at the forward end. A threaded ring 36 has an internal abutment 37 engaging the flange 34 on the shell 32. The ring 36 has internal threads which interengage with threads on the rear end of the shell member 30. The rear end of the central shell part 32 has a flange 40 which holds on the connecting ring 42 by means of a suitable internal abutment 43. The ring 42 has interior threads which engage the threaded support ring 44 secured on the rear shell part 46 of the burner. The rear shell part 46 has a circular inlet defined by the support ring 44 which is suitably secured as by welding to the rear shell part 46. The outlet portion 48 has the shape of a sector of an annulus and is connected to an inlet 49 of the turbine 52. The turbine inlet 49 has a generally annular shape divided by a plurality of radial struts 51 into sector portions and is connected to a series of sector shaped portions 48. The struts are welded to the turbine inlet 49. The outlet portion 48 is secured to turbine inlet 49 by a weld 53 along the top edge and by a weld 55 along the bottom edge as best shown in Figure 3 and to the struts 51 by welds 57 along the sides as best shown in Figures 8 and 9. The inlet opening 50 is formed in the turbine housing 54 which, through the inter-connection of the power plant housing 56, is connected to the compressor housing 18.

The liner for the burner 12 has a forward portion 60 mounted in the forward portion 30 of the burner shell by means of spacer studs 62 secured to both the shell and liner. An igniter or spark plug 64, positioned in aligned apertures in the forward portion of the shell and the liner, provides additional support for this portion of the liner. A fuel injector 66 is also suitably positioned in aligned apertures in the passage 16 and in a cap or shield 68 secured to and partially covering the forward opening in the liner portion 60. On the exterior of the central liner part 70 at both ends a plurality of spacer fingers 69 are secured to support the liner 70 in spaced relation to the shell 32. The central portion 70 of the liner is slightly tapered so that the rear portion is somewhat larger than the forward portion and has a plurality of apertures 72 to provide additional air to burn the fuel. The forward end of the liner 70 has an enlarged flange 73 which fits around the end of the forward portion 60 of the liner. The rear end of the liner 70 has an inwardly turned flange 74 which helps slip the liner into the rear portion 80 of the liner. The rear portion of the liner is formed of a right part 76 and a left part 78 which, when fitted together, provide a liner member 80 having an inlet portion 82 of circular shape and an outlet portion 84 having the shape of a sector of an annulus. The inlet 82 has a peripheral flange 83 to stiffen the liner 80 and to support the liner 80 in the rear shell portion. The flange 83 fits loosely in the rear shell portion so that the liner 80 may be easily removed. The flange 83 is apertured at 85 to allow air to flow between the shell and liner. The top and bottom portions of the outlet portion 84 fit above and below the nozzle inlet portion 50 of the turbine which consists of a pair of concentric rings and have apertures 87 to allow the cooling air flowing between the shell and liner to flow into the gas passage. The side portions of outlet 84 have a recess 91 so that the side edges of the rear liner part 80 are in substantial alignment with the rear edge of the strut 51. Each side of the outlet portion 84 has a pair of bosses 93 to space the liner 80 from the strut to allow the cooling air to flow by and cool the side surfaces of the liner. The parts 76 and 78 have reversely bent flanges 86 on the meeting sides which are secured together by a channel shaped fastening element 88. The fastening element 88 has a handle portion 90 extending at an angle to the channel portion of the fastening device so that the handle 90 is in an axial position when assembled between the shell 32 and the liner portion 70. The pin 92 screwed into a bushing 94 in the central portion 32 of the shell enters the apertured bushing 96 in the liner 70 to position the liner.

In order to remove the old liner for replacement with a new liner, the ring connectors 36 and 42 are unscrewed from the shell portions 28 and 46, respectively, to release the central shell portion 32 therefrom. The fuel injector 66 is then slid forward so that the forward part of the burner shell 28 and liner 60 can be moved forward on the bushing 24 and rings 26. This forward movement of the forward liner 60 disengages it from the flange 73 of the central liner portion 70. Thus both the cylindrical shell portion 32 and the substantially cylindrical liner portion 70 may be moved slightly forward and lifted radially outward as a unit. The locating dowel pin 92 may then be removed so that the liner may be slid out from the shell. Then the fastening devices 88 are slid off the rear portions 76 and 78 of the liner and the two parts moved toward the center of the openings in the shell and overlapped or nested, so that the rear portion 84 of the liner may be drawn through the circular opening 44 in the rear shell part 46.

The installation of the new liner is accomplished by merely reversing this procedure. The shell parts 76 and 78 are inserted in nested position and placed around the turbine inlet 50. Fasteners 88 are then slipped over the mating flanges 86 on the parts 76 and 78 which form the rear portion 80 of the liner. The central part of the shell 32 and of the liner 70 are then placed in concentric relation and the pin 92 is screwed into place to hold the parts together. The shell and liner are then inserted as a unit. The flange 74 at the rear end of the liner 70 is then slipped within the end of the liner portion 80. When the shell and liner portions are properly positioned the forward shell portion 28 and liner portion 60 are moved rearward. An outwardly bent flange 73 enables the forward end of the liner 70 to slide over the liner portion 60. The ring 42 on the rear end of central shell part 32 is then threaded on the rear shell part 46 and the forward ring 36 on the central shell part 32 is threaded on the forward shell part 28.

The forward shell part 28 may move with respect to the compressor outlet passage 20 and is sealed thereto by the rings 26. The parts are secured in locked position by the pin 92 which is screwed into a bushing in the shell 32 and fits an aperture in the liner 70 before assembly in the power plant. The handles 90 of the fastening device are positioned between the shell 32 and liner 70. The fingers 69 support the front and rear end of the central liner portion in spaced relation to the burner shell 12, consisting of the forward part 28, central part 32 and rear part 46, so that air may flow between the liner and shell to cool the liner. The flange 83 supports the rear liner 80 and has apertures 85 to allow the cooling air to flow through the space between the liner and shell. This cooling air reenters the gas passage through apertures 87 just before the gas enters the turbine 52 and through the space between the liner 80 and the strut.

The above specific embodiment is illustrative of the invention. It will be apparent that numerous modifications may be made within the scope of the invention as defined in the appended claims.

I claim:

1. In a combustion chamber, a supporting frame, a forward shell part mounted for axial sliding movement on said frame, a rear shell part secured to said frame, a central shell part, securing means connecting said central shell part to both said forward and said rear shell parts, a forward liner portion inside and supported by said forward shell part, a rear liner portion consisting of two half sections, means securing said sections together, and a central liner portion telescopically supported by said forward liner portion.

2. In a combustion chamber, a supporting frame, a forward shell part mounted for axial sliding movement on said frame, sealing rings on said frame engaging said forward shell part, a central shell part, securing means connecting said central shell part to said forward shell part, a forward liner portion inside and supported by said forward shell part, and a central liner portion telescopically supported by said forward liner portion.

3. In a combustion chamber, a supporting frame, a forward shell part mounted for axial sliding movement on said frame, a central shell part, securing means connecting said central shell part to said forward shell part, a forward liner portion inside and supported by said forward shell part, and a central liner portion telescopically supported by said forward liner portion and disengaged by axial sliding movement of said forward shell portion and said forward liner portion.

4. In a combustion chamber, a supporting frame, a forward shell part mounted for axial sliding movement on said frame, a rear shell part secured to said frame, a central shell part, securing means connecting said central shell part to both said forward and said rear shell parts, a forward liner portion inside and supported by said forward shell part, a rear liner portion consisting of two half sections with reversely bent flanges at the meeting edges, securing strips having a C-shaped cross section fitting over said flanges to secure said sections together, and a central liner portion telescopically supported by said forward liner portion and by means on said central shell part.

5. In a combustion chamber, a shell portion having an inlet and an outlet, a liner located in said shell, means to hold said liner in spaced relation to said shell to provide an air passage between the liner and shell and a gas passage in the liner, a shield to substantially block the entrance of said liner, air inlet openings distributed along the length of said liner to supply air to the combustion chamber and gas passage within said liner, and a turbine inlet having a pair of rings, the rear portions of said liner and shell being secured to said rings, said rings closing the air passage between said shell and liner at the top and bottom at the outlet of said shell and liner, a cooling air aperture in the top and bottom of the rear portion of said liner adjacent said rings to provide for the flow of cooling air from the air passage into the gas passage.

6. In a combustion chamber, a shell portion and a liner portion, a turbine inlet having two rings, struts secured to said rings and extending forward of said rings, the shell portion having an end portion secured to said rings and the forward portion of said struts, a liner portion within said shell having an end fitting into the space between the struts, and means to space the liner at the side from the strut to allow cooling air to flow past the side of the liner.

7. In a combustion chamber, a shell portion and a liner portion, a turbine inlet having two concentric rings, struts extending between said rings and secured to said rings and extending forward of said rings, the shell portion having an end portion secured to said rings and the forward portion of said struts, a liner portion within said shell having an end fitting into the space between the struts and rings, means to space the liner at the side from the strut to allow cooling air to flow past the side of the liner, and an aperture in top and bottom walls of said liner end adjacent said rings to allow cooling air to flow from the passage between the shell and liner to the gas passage within said liner.

8. In a combustion chamber, a shell portion and a liner portion, a turbine inlet having two concentric rings, radial struts between and secured to said rings and extending forward of said rings, the shell portion having a cross section having the shape of a sector of an annulus at the end, said end being secured to the outside portion of said rings and the forward portion of said struts, a liner portion having a cross section having the shape of a sector of an annulus at the end fitting into the space between the struts and rings, means to space the liner at the side from the strut to allow cooling air to flow past the side of the liner, and an aperture in top and bottom walls of said liner end adjacent said rings to allow cooling air to flow from the passage between the shell and liner to the gas passage within said liner.

9. In a combustion chamber, a frame having an inlet portion and an outlet portion located in longitudinally spaced relation, said inlet portion having an inlet passage flaring outwardly toward said outlet portion and an external cylindrical surface, a forward shell member having an internal cylindrical surface at one end telescopingly engaging said external cylindrical surface to slidably support said forward shell member for movement between an assembled and a disassembled position, said forward shell member having an internal passage extending from said internal cylindrical surface forming an outwardly flaring continuation of said inlet passage when said shell member is in the assembled position and having a large circular end, a forward lining member having a cup shape rigidly mounted within said forward shell member and having side walls flaring in the same direction as and spaced from said forward shell member, said forward lining member having a base smaller than the large end of said inlet passage to permit telescoping movement within said inlet passage in the disassembled position of said forward shell member and a circular rim at the large end, a central cylindrical shell having one end detachably secured to said large end portion of the forward shell member in the assembled position, a cylindrical liner concentrically positioned within and spaced from said central shell and having one end supported on said circular rim of said forward lining member in assembled position, a circular support mounted on said frame adjacent said outlet portion and detachably secured to the other end of said central shell, said outlet portion having a passage having the sectional shape of a sector of an annulus, a rear shell having a circular section at one end attached to said support and a sector of an annulus shape at the other end attached to said frame around the passage in said outlet portion, a rear liner positioned within said rear shell, said rear liner having a similar and smaller cross section to provide a space between said liner and shell, and means to support said rear liner in spaced relation with said rear shell, the other end of said central liner being supported within said rear liner, said central shell and liner being removable as a unit after detaching at each end and moving said forward shell to the disassembled position, said rear liner consisting of two parts detachably secured together on a line axially connecting the center of both arcuate portions of the end having the shape of a sector of an annulus and the end having a circular shape to permit nesting of the two parts to withdraw the liner through the circular support.

10. In a combustion chamber, a frame having an inlet portion and an outlet portion located in longitudinally spaced relation, said inlet portion having an inlet passage flaring outwardly toward said outlet portion and an external cylindrical surface, a forward shell member having an internal cylindrical surface at one end telescopingly engaging said external cylindrical surface to slidably support said forward shell member for movement between an assembled and a disassembled position, said forward shell member having an internal passage extending from said internal cylindrical surface forming an outwardly flaring continuation of said inlet passage when said shell member is in the assembled position and having a large circular end, a forward lining member having a cup shape rigidly mounted within said forward shell member and having side walls flaring in the same direction as and spaced from said forward shell member, said forward lining member having a base smaller than the large end of said inlet passage to permit telescoping movement within said inlet passage in the disassembled position of said forward shell member and a circular rim at the large end, a central cylindrical shell having one end detachably secured to said large end portion of the forward shell member in the assembled position, a cylindrical liner concentrically positioned within and spaced from said central shell and having one end supported on said circular rim of said forward lining member in assembled position, a circular support mounted on said frame adjacent said outlet portion and detachably secured to the other end of said central shell, said outlet portion having a passage having the sectional shape of a sector of an annulus, a rear shell having a circular section at one end attached to said support and a sector of an annulus shape at the other end attached to said frame around the passage in said outlet portion, a rear liner positioned within said rear shell, said rear liner having a similar and smaller cross section to provide a space between said liner and shell, and means to support said rear liner in spaced relation with said rear shell, the other end of said central liner being supported within said rear liner, and said central shell and liner being removable as a unit after detaching at each end and moving said forward shell to the disassembled position.

11. In a combustion chamber, a frame having an inlet portion and an outlet portion located in longitudinally spaced relation, said inlet portion having an inlet passage flaring outwardly toward said outlet portion and an external surface, a forward shell member having an internal surface at one end telescopingly engaging said external surface to slidably support said forward shell member for movement between an assembled and a disassembled position, said forward shell member having an internal passage extending from said internal surface forming an outwardly flaring continuation of said inlet passage when said shell member is in the assembled position and having a large end, a forward lining member having a cup shape rigidly mounted within said forward shell member and having side walls flaring in the same direction as and spaced from said forward shell member, said forward lining member having a base smaller than the large end of said inlet passage to permit telescoping movement within said inlet passage in the disassembled position of said forward shell member and a rim at the large end, a central shell having one end detachably secured to said large end portion of the forward shell member in the assembled position, a liner concentrically positioned within and spaced from said central shell and having one end supported on said rim of said forward lining member in assembled position, a support mounted on said frame adjacent said outlet portion and detachably secured to the other end of said central shell, said outlet portion having a passage having the sectional shape of a sector of an annulus, a rear shell having a sector of an annulus shape at the one end attached to said frame around the passage in said outlet portion and a section having a smaller transverse dimension at the other end attached to said support, a rear liner positioned within said rear shell, said rear liner having a similar and smaller cross section to provide a space between said liner and shell, and means to support said rear liner in spaced relation with said rear shell, the other end of said central liner being supported within said rear liner, said central shell and liner being removable as a unit after detaching at each end and moving said forward shell to the disassembled position, said rear liner consisting of two parts detachably secured together on a line axially connecting the center of both arcuate portions of the end having the shape of a sector of an annulus and said other end to permit nesting of the two parts to withdraw the liner through the circular support.

12. In a combustion chamber, a frame having an outlet portion, a circular support mounted on said frame adjacent said outlet portion, said outlet portion having a passage having the sectional shape of a sector of an annulus, a rear shell having a circular section at one end attached to said support and a sector of an annulus shape at the other end attached to said frame around the passage in said outlet portion, a rear liner positioned within said rear shell, said rear liner having a similar and smaller cross section to provide a space between said liner and shell, and means to support said rear liner in spaced relation with said rear shell, said rear liner consisting of two parts detachably secured together on a line axially connecting the center of both arcuate portions of the end having the shape of a sector of an annulus and the end having a circular shape and shaped for nesting of the two parts to withdraw the liner through the circular support.

13. In a combustion chamber, a portion connecting a circular passage with a sector of an annulus passage, said portion having a round section at one end and a sector of an annulus section at the other end; means for supporting the said portion adjacent the round end thereof defining an opening smaller than the largest transverse dimension of the sector of an annulus end; the said portion comprising two parts meeting along a surface extending from end to end of the portion, the said surface crossing the sector of an annulus end from the inner to the outer circumferential portions thereof; and readily removable means for joining the two parts accessible from the said round end, the two parts being capable of being nested together upon removal of the joining means so that the greatest dimension of the portion is less than that of the opening so that the said portion may be withdrawn through the said opening.

14. In a combustion chamber, a supporting frame defining an opening; a combustion products duct extending from said opening and having one end smaller than the opening and the other end with one transverse dimension greater than any transverse dimension of the opening; the said duct comprising two parts meeting on a surface extending lengthwise of the duct and transversely to the said one transverse dimension; and readily removable means for securing the said parts together, the parts being capable of being collapsed together upon removal of the securing means and being small enough for removal through the opening when so collapsed.

References Cited in the file of this patent

UNITED STATES PATENTS

| | | |
|---|---|---|
| 822,004 | Kronauer | May 29, 1906 |
| 1,374,866 | Spencer | Apr. 12, 1921 |
| 2,432,359 | Streid | Dec. 9, 1947 |
| 2,437,385 | Halford | Mar. 9, 1948 |
| 2,445,114 | Halford | July 13, 1948 |
| 2,479,573 | Howard | Aug. 23, 1949 |
| 2,494,821 | Lombard | Jan. 17, 1950 |
| 2,525,206 | Clarke | Oct. 10, 1950 |
| 2,547,619 | Buckland | Apr. 3, 1951 |
| 2,591,399 | Buckland et al. | Apr. 1, 1952 |
| 2,592,060 | Oulianoff | Apr. 8, 1952 |